US012767805B2

(12) United States Patent
Mitsugi et al.

(10) Patent No.: US 12,767,805 B2
(45) Date of Patent: Oct. 20, 2026

(54) INSULATING RESIN COMPOSITION FOR ELECTRIC POWER CABLE, ELECTRIC POWER CABLE, AND ELECTRIC POWER CABLE CONNECTING PART

(71) Applicant: FURUKAWA ELECTRIC CO., LTD., Tokyo (JP)

(72) Inventors: Shingo Mitsugi, Tokyo (JP); Tetsuya Mieda, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 207 days.

(21) Appl. No.: 18/713,706

(22) PCT Filed: Dec. 15, 2022

(86) PCT No.: PCT/JP2022/046229

§ 371 (c)(1),
(2) Date: May 28, 2024

(87) PCT Pub. No.: WO2023/120374

PCT Pub. Date: Jun. 29, 2023

(65) Prior Publication Data

US 2025/0034381 A1 Jan. 30, 2025

(30) Foreign Application Priority Data

Dec. 23, 2021 (JP) ................................ 2021-209527

(51) Int. Cl.
*C08L 23/00* (2006.01)
*C08L 23/12* (2006.01)
(Continued)

(52) U.S. Cl.
CPC ............... *C08L 23/12* (2013.01); *C08L 23/14* (2013.01); *C08L 25/08* (2013.01); *C08L 53/00* (2013.01);
(Continued)

(58) Field of Classification Search
CPC . H01B 3/441; H01B 3/44; H01B 9/00; H01B 3/28; H01B 9/02; H01B 13/06;
(Continued)

(56) References Cited

U.S. PATENT DOCUMENTS

2022/0372262 A1 11/2022 Yamasaki et al.
2023/0017246 A1 1/2023 Mieda et al.

FOREIGN PATENT DOCUMENTS

JP 2018035237 A 3/2018
KR 102284030 B1 7/2021
(Continued)

OTHER PUBLICATIONS

Extended European Search Report issued Nov. 13, 2025 in the EP Patent Application No. 22911082.0.

*Primary Examiner* — Pete T Lee
(74) *Attorney, Agent, or Firm* — CKC & PARTNERS CO., LLC

(57) ABSTRACT

The insulating resin composition for electric power cable includes a polypropylene resin (A) that is a propylene-based polymer, and a styrene-based thermoplastic elastomer (B). The temperature characteristic curve of loss tangent tan δ obtained by dynamic viscoelasticity measurement at a frequency of 100 rad/s has a high-temperature-side temperature region in which the loss tangent tan δ is 0.1 or more and 0.4 or less, and a low-temperature-side temperature region in which the loss tangent tan δ is less than 0.1, and the highest temperature of the high-temperature-side temperature region is 240° C. or higher.

16 Claims, 3 Drawing Sheets

(51) Int. Cl.

| | |
|---|---|
| ***C08L 23/14*** | (2006.01) |
| ***C08L 25/08*** | (2006.01) |
| ***C08L 53/00*** | (2006.01) |
| ***H01B 3/44*** | (2006.01) |
| ***H01B 9/02*** | (2006.01) |

(52) U.S. Cl.
CPC ............. *H01B 3/441* (2013.01); *H01B 3/442* (2013.01); *H01B 9/02* (2013.01); *C08L 2203/202* (2013.01)

(58) Field of Classification Search
CPC .......... H01B 3/442; H01B 7/292; H01B 1/24; H01B 3/447; H01B 7/0291; H01B 3/22; H01B 9/001; H01B 3/307; H01B 7/02
See application file for complete search history.

(56) References Cited

FOREIGN PATENT DOCUMENTS

| | | | | | |
|---|---|---|---|---|---|
| KR | 20210140731 | A | * | 11/2021 | ............. H01B 3/441 |
| KR | 20230065683 | A | * | 5/2023 | ............. C08K 5/053 |
| MY | 158149 | A | * | 9/2016 | ............. H01B 3/448 |
| WO | 2021090579 | A1 | | 5/2021 | |
| WO | 2021200935 | A1 | | 10/2021 | |

* cited by examiner

INSULATING RESIN COMPOSITION FOR ELECTRIC POWER CABLE, ELECTRIC POWER CABLE, AND ELECTRIC POWER CABLE CONNECTING PART

TECHNICAL FIELD

The present disclosure relates to an insulating resin composition for electric power cable, an electric power cable and an electric power cable connecting part.

BACKGROUND ART

Conventionally, in the insulating layer of a DC electric power cable and an AC electric power cable (unless explicitly stated in particular, the DC electric power cable and the AC electric power cable are jointly referred to as electric power cable), materials having a composition consisting of cross-linked polyethylene has been used.

In the case of using polyethylene in the insulating layer of an electric power cable, the insulating layer may be broken by the heat generated from the conductor of the electric power cable. In order to suppress such breakage due to heat, crosslinking the polyethylene has been carried out. On the other hand, when crosslinking polyethylene, problems may occur such as a decline in recyclability of the insulating layer, a drastic increase in processing time due to adding the crosslinking process, a decline in electrical insulation property of the insulating layer due to crosslinking residue, etc.

To counter these problems, composition development using polypropylene instead of crosslinked polyethylene has been considered. Compared to polyethylene, since the melting point of polypropylene is high, the breakdown of the insulating layer due to heat generated from the conductor of the electric power cable is suppressed, even without crosslinking polypropylene.

However, although the polypropylene is relatively soft among resins, polypropylene is harder than polyethylene. The electric power cable made using polypropylene as the insulating layer is difficult to bend easily; therefore, compared to crosslinked polyethylene, the characteristics of the electric power cable such as workability and transportability may be poor. In addition, similar to crosslinked polyethylene, the electrical insulation property at high temperature of polypropylene is low. In order to improve the electrical insulation property of polypropylene, composition improvement such as adding additives or modifying the polypropylene has been considered. Based on such a situation, composition development is being actively carried out for improving the flexibility and the electrical insulation property in the polypropylene.

For example, what is generally carried out as in automotive applications is a method which adds an ethylene propylene rubber (EPR), or olefinic elastomer (TPO) which is a copolymer of ethylene and α-olefin, to the polypropylene as a softening agent. However, since polypropylene and EPR or TPO are very difficult to mix, even if sufficiently kneading as with twin-screw extrusion kneading, deterioration in the electrical insulation property may occur due to the interparticle boundary on the nano order.

In addition, since it is difficult to mix polypropylene with EPR or TPO, a method has been carried out which adds additives such as trace amounts of epoxy resin, insulating oil containing aromatic compounds, and paraffins. However, new problems may occur such as the immersion time of the additive in the resin component not being short, and bleed out due to oil content addition to not obtain a long-termed sufficient characteristics. In addition, there is also a method of adding antioxidants not containing sulfur such as hindered phenol antioxidants or arylamine antioxidants. However, such antioxidants are liquid form or powder form; therefore, it may not mix sufficiently with the resin component due to poor dispersibility.

In addition, EPR and TPO soften above 90° C. Due to polypropylene melting at 135 to 175° C., so-called sag in which the resin sags under its own weight occurs after extrusion molding of the electric power cable, and further, the possibility of falling off is high.

Furthermore, the polypropylene composition made by kneading EPR and TPO tends to undergo thermal deformation due to the molecular fluctuation such as when heat is applied. For this reason, due to the usage environmental temperature of the electric power cable, the electric power cable deforms after the elapse of a long period, and there is a high possibility of causing a sudden decline in electrical insulation property.

In addition, Patent Document 1 describes a resin composition for wire and cable containing a resin composition having a copolymer including styrene blocks containing constituent units derived from styrene, and ethylene blocks containing constituent units derived from ethylene, in which the content proportion of the constituent units derived from styrene relative to total constituent units constituting the resin component is 1.1 mol % or more to 40 mol % or less. As the copolymer, styrene/ethylene-propylene/styrene block copolymers, or styrene/ethylene-ethylene-propylene-styrene block copolymers, etc. can be exemplified. In addition, the copolymer may have an olefin of propylene or the like other than the styrene blocks and ethylene blocks.

However, with the resin composition for wire and cable of patent Document 1 assuming the content proportion of the constituent units derived from styrene, since the flexibility is insufficient, the flexibility of the electric power cable may be poor. Furthermore, with the resin composition for wire and cable of Patent Document 1, deficiencies such as sag may occur in the electric power cable.

CITATION LIST

Patent Document

Patent Document 1: Japanese Unexamined Patent Application, Publication No. 2018-035237

DISCLOSURE OF THE INVENTION

Problems to be Solved by the Invention

An object of the present disclosure is to provide an insulating resin composition for electric power cable, an electric power cable and an electric power cable connecting part which are superior in flexibility and electrical insulation property, and can suppress thermal deformation and sag, even without conducting a crosslinking process.

Means for Solving the Problems

[1] An insulating resin composition for electric power cable, including: a polypropylene resin (A) which is a propylene-based polymer; and a styrene-based thermoplastic elastomer (B), in which a temperature characteristic curve of loss tangent tan δ obtained by dynamic viscoelasticity measurement at a frequency of 100 rad/s has a high-temperature-side temperature region in which the loss tangent tan δ is 0.1 or more and 0.4 or less, and a low-temperature-side temperature region in which the loss tangent tan δ is less than 0.1; and a highest temperature of the high-temperature-side temperature region is 240° C. or more.

[2] In the insulating resin composition for electric power cable according to [1] above, a lowest temperature of the high-temperature-side temperature region is 90° C. or more and 175° C. or less.

[3] In the insulating resin composition for electric power cable according to [1] or [2] above, a lowest temperature of the high-temperature-side temperature region is 90° C. or more and 150° C. or less.

[4] In the insulating resin composition for electric power cable according to any one of [1] to [3] above, a highest temperature in a range of loss tangent tan δ of 0.1 or more and 0.3 or less in the high-temperature-side temperature region is 160° C. or more.

[5] In the insulating resin composition for electric power cable according to any one of [1] to [4] above, the loss tangent tan δ at 90° C. on the temperature characteristic curve of the loss tangent tan δ is less than 0.1.

[6] In the insulating resin composition for electric power cable according to any one of [1] to [5] above, a content ratio of the polypropylene resin (A) and the styrene-based thermoplastic elastomer (B) is 20.0 to 55.0:45.0 to 80.0 by % by mass of the polypropylene resin (A) the styrene-based thermoplastic elastomer (B).

[7] In the insulating resin composition for electric power cable according to any one of [1] to [6] above, a content proportion of styrene contained in the insulating resin composition for electric power cable is 10% by mass or more and 30% by mass or less.

[8] In the insulating resin composition for electric power cable according to any one of [1] to [7] above, the styrene-based thermoplastic elastomer (B) contains a constituent unit derived from styrene, and contains at least one of a constituent unit derived from ethylene and a constituent unit derived from a C3 to C30 α-olefin.

[9] In the insulating resin composition for electric power cable according to any one of [1] to [8] above, when establishing a total of the constituent unit derived from styrene, the constituent unit derived from ethylene, and the constituent unit derived from a C3 to C30 α-olefin that constitute the styrene-based thermoplastic elastomer (B) as 100% by mass, the constituent unit derived from styrene is 10.0% by mass or more and 60.0% by mass or less, and the constituent unit derived from ethylene is 20.0% by mass or more and 70.0% by mass or less.

[10] In the insulating resin composition for electric power cable according to any one of [1] to [9] above, the polypropylene resin (A) is a homo polypropylene.

[11] In the insulating resin composition for electric power cable according to any one of [1] to [9] above, the polypropylene resin (A) is a random polypropylene containing a constituent unit derived from ethylene and a constituent unit derived from a C3 to C30 α-olefin.

[12] In the insulating resin composition for electric power cable according to any one of [1] to [9] above, the polypropylene resin (A) is a block polypropylene containing a homo polypropylene, a constituent unit derived from ethylene, and a constituent unit derived from a C3 to C30 α-olefin.

[13] In the insulating resin composition for electric power cable according to any one of [1] to [12] above, the insulating resin composition for electric power cable consists of the polypropylene resin (A) and the styrene-based thermoplastic elastomer (B).

[14] In the insulating resin composition for electric power cable according to any one of [1] to [13] above, a dielectric loss tangent when applying an AC electric field of 30 kV/mm at 90° C. is 0.15% or more.

[15] In the insulating resin composition for electric power cable according to any one of [1] to [14] above, a ratio (Q300/Q0) of electric charge amount (Q300) after 5 minutes when applying a DC electric field of 30 kV/mm at 90° C. relative to initial electric charge amount (Q0) is 2.00 or more.

[16] An electric power cable includes: a conductor; an internal semiconducting layer covering an outer circumference of the conductor; an insulating layer consisting of the insulating resin composition for electric power cable according to any one of [1] to [15] above covering an outer circumference of the internal semiconducting layer; and an external semiconducting layer covering an outer circumference of the insulating layer.

[17] An electric power cable connecting part includes: a connecting part internal semiconducting layer that covers a connecting part connecting a conductor of one electric power cable with a conductor of another electric power cable, an exposed portion of the conductor of the one electric power cable, and an exposed portion of the conductor of the other electric power cable; a connecting part insulating layer consisting of the insulating resin composition for electric power cable according to any one of [1] to [15] above, the connecting part insulating layer covering an outer circumference of the connecting part internal semiconducting layer; and a connecting part external semiconducting layer that covers an outer circumference of the connecting part insulating layer.

Effects of the Invention

According to the present disclosure, it is possible to provide an insulating resin composition for electric power cable, an electric power cable and an electric power cable connecting part which are superior in flexibility and electrical insulation property, and can suppress thermal deformation and sag, even without conducting a crosslinking process.

PREFERRED MODE FOR CARRYING OUT THE INVENTION

Hereinafter, the present invention will be explained in detail based on embodiments.

As a result of rigorous investigation, the present inventors found that, by using a thermoplastic elastomer superior in compatibility with polypropylene resin, without conducting crosslinking or oil extension, and focusing on the temperature characteristic curve of the loss tangent tan δ obtained by dynamic viscoelasticity measurement of the insulating resin composition for electric power cable, it is possible to produce without carrying out a crosslinking process, and be superior in flexibility and electrical insulation property, and suppress thermal deformation and sag due to molecular fluctuation such as when heat is applied, thereby arriving a completion of the present disclosure based on this knowledge.

The insulating resin composition for electric power cable (hereinafter also referred to simply as insulating resin composition) according to the embodiment includes: a polypropylene resin (A) which is a propylene-based polymer; and a styrene-based thermoplastic elastomer (B), in which a temperature characteristic curve of loss tangent tan δ obtained by dynamic viscoelasticity measurement at a frequency of 100 rad/s has a high-temperature-side temperature region in which the loss tangent tan δ is 0.1 or more and 0.4 or less, and a low-temperature-side temperature region in which the loss tangent tan δ is less than 0.1; and a highest temperature of the high-temperature-side temperature region is 240° C. or more.

Figure 1:
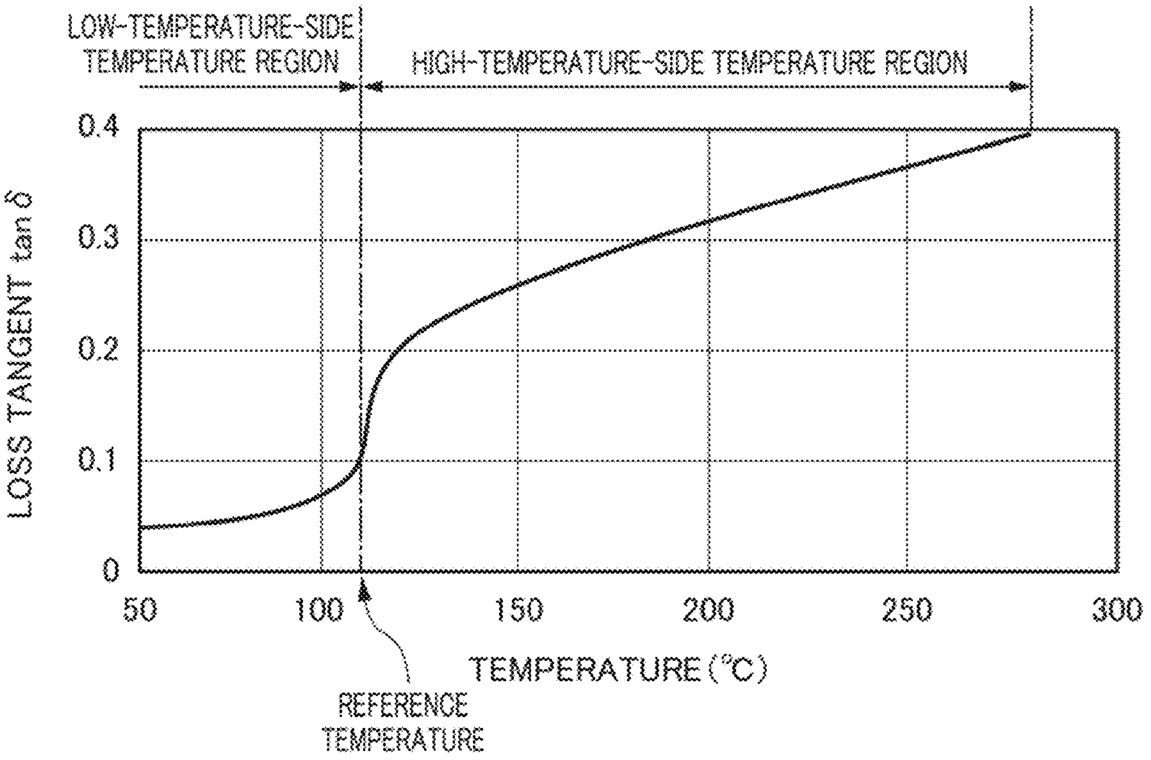
FIG. 1 is an example of a temperature characteristic curve of the loss tangent tan δ obtained by dynamic viscoelasticity measurement at a frequency of 100 rad/s relative to the insulating resin composition for electric power cable according to an embodiment.

FIG. 1 is an example of a temperature characteristic curve of the loss tangent tan δ obtained by dynamic viscoelasticity measurement at a frequency of 100 rad/s relative to the insulating resin composition for electric power cable according to an embodiment. It should be noted that FIG. 1 and FIG. 2 described later show the temperature characteristic curve of the loss tangent tan δ having a loss tangent tan δ up to 0.4 for convenience.

As shown in FIG. 1, for the insulating resin composition for electric power cable according to the embodiment, the temperature characteristic curve of the loss tangent tan δ obtained by dynamic viscoelasticity measurement at a frequency of 100 rad/s (hereinafter also referred to simply as temperature characteristic curve of loss tangent tan δ) has a high-temperature-side temperature region in which the loss tangent tan δ is 0.1 or more and 0.4 or less, and a low-temperature side temperature region in which the loss tangent tan δ is less than 0.1.

For the high-temperature-side temperature region and the low-temperature-side temperature region, in the temperature characteristic curve of the loss tangent tan δ, the temperature when the loss tangent tan δ is 0.1 is defined as a reference temperature, more than the reference temperature is defined as the high-temperature-side temperature region, and less than the reference temperature is defined as the low-temperature-side temperature region. In this way, the temperature characteristic curve of the loss tangent tan δ has the reference temperature, the high-temperature-side temperature region and the low-temperature-side temperature region. In addition, the temperature characteristic curve of the loss tangent tan δ is continuous between the high-temperature-side temperature region and the low-temperature-side temperature region.

Figure 2:
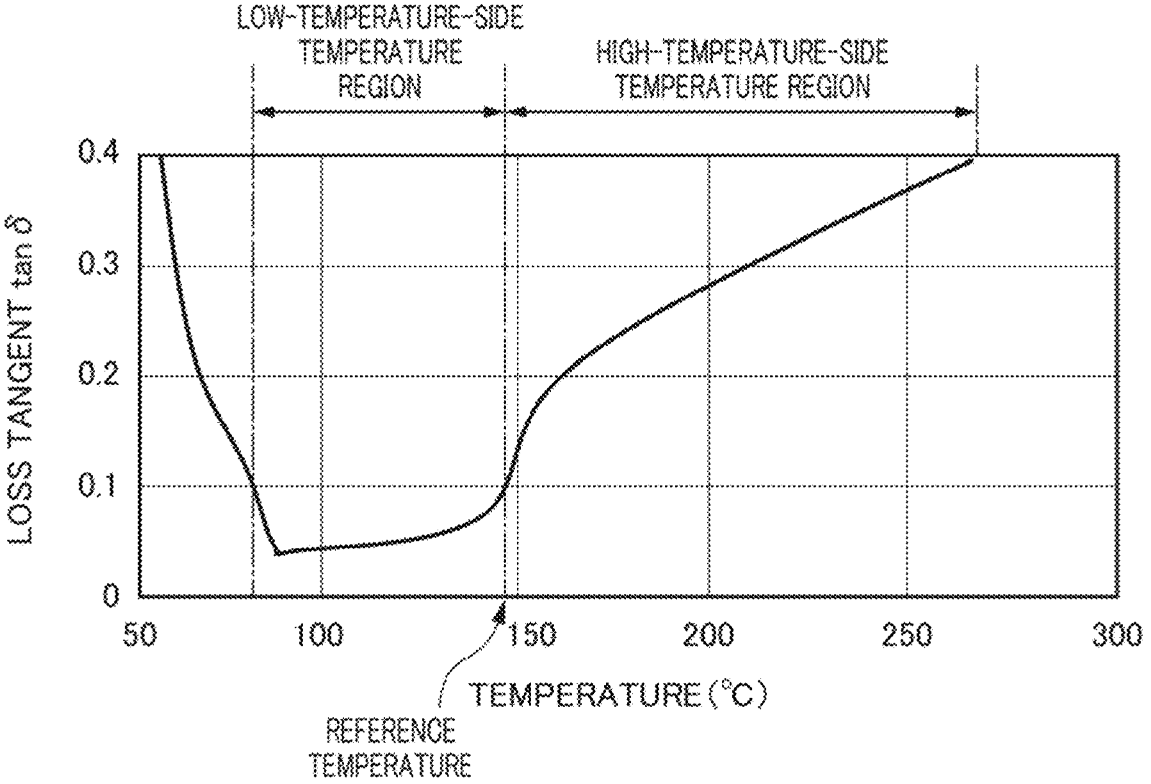
FIG. 2 is another example of a temperature characteristic curve of the loss tangent tan δ obtained by dynamic viscoelasticity measurement at a frequency of 100 rad/s relative to the insulating resin composition for electric power cable according to an embodiment.

In addition, FIG. 2 is another example of a temperature characteristic curve of the loss tangent tan δ obtained by dynamic viscoelasticity measurement at a frequency of 100 rad/s relative to the insulating resin composition for electric power cable according to an embodiment. As shown in FIG. 2, in the case of a plurality of temperatures when the loss tangent tan δ is 0.1 being present on the temperature characteristic curve of the loss tangent tan δ, the highest temperature among the plurality of temperatures at which the loss tangent tan δ is 0.1 is defined as the reference temperature.

The low-temperature-side temperature region which is a temperature region in which the loss tangent tan δ is less than 0.1, in the temperature characteristic curve of the loss tangent tan δ shown in FIG. 1, is a temperature region lower than the reference temperature, and in the temperature characteristic curve of the loss tangent tan δ shown in FIG. 2, is a temperature region higher than the temperature on the low-temperature side at which the loss tangent tan δ is 0.1, and lower than the reference temperature. The temperature on the low-temperature side at which the loss tangent tan δ is 0.1 is lower than the reference temperature.

The loss tangent tan δ in the high-temperature-side temperature region which is the higher temperature side from the low-temperature-side temperature region is 0.1 or more and 0.4 or less. When the loss tangent tan δ in the high-temperature-side temperature region is 0.1 or more, since the torque during extrusion molding of the insulating resin composition declines, the extrusion molding of the insulating resin composition is easy. In addition, when the loss tangent tan δ in the high-temperature-side temperature region is 0.4 or less, since it is possible to suppress sag of the insulating resin composition obtained by extrusion molding, the shape of the insulating resin composition can be stably maintained over a long period. When using the insulating resin composition in an electric power cable or an electric power cable connecting part, it is possible to maintain a state in which the roundness of the cross section of the electric power cable or the electric power cable connecting part is small over a long period.

For the high-temperature side temperature region in which the loss tangent tan δ is 0.1 or more and 0.4 or less, the highest temperature is 240° C. or more. For example, in the temperature characteristic curve of loss tangent tan δ shown in FIG. 1, the highest temperature of the high-temperature-side temperature region is about 270° C.

When the highest temperature of the high-temperature-side temperature region is 240° C. or more, for example, since sag will no longer occur with the weight of the resin itself due to melting during molding, it is effective to keep the roundness of the cable. From the viewpoint of the roundness of the cable, the highest temperature of the high-temperature-side temperature region is 240° C. or more, and is preferably 300° C. or less. If it becomes a composition having a highest temperature of the high-temperature-side temperature region higher than 300° C., since the insulating resin composition is considered to have a low loss tangent tan δ even when heating close to 300° C., the insulating resin composition is considered to be a very hard material. When extrusion molding the insulating resin composition with such a composition, very large torque acts in the extrusion molding temperature from, for example, 180 to 240° C. and thus extrusion molding is not easy. The problem of such torque can be solved if further raising the extrusion molding temperature; however, thermal degradation of the insulating resin composition may tend to progress by the rise in temperature. In addition, when adding a large amount of antioxidant to the insulating resin composition as this thermal degradation problem, the decline in insulating property, occurrence of bleed out, etc. may be considered.

The highest temperature of the high-temperature-side temperature region can rise by increasing the content of the styrene-based thermoplastic elastomer (B). For example, by increasing the content proportion of the styrene-based thermoplastic elastomer (B) up to 80% (polypropylene resin (A):styrene-based thermoplastic elastomer (B)=20:80 by mass %), it is possible to raise the highest temperature of the high-temperature-side temperature region up to about 300° C.

In addition, in the temperature characteristic curve of the loss tangent tan δ, the lowest temperature of the high-temperature-side temperature region is preferably 90° C. or more and 175° C. or less, and more preferably 90° C. or more and 150° C. or less. The lowest temperature of the high-temperature-side temperature region is the reference temperature. When the lowest temperature of the high-temperature-side temperature region is 90° C. or more, there will be no molecular structure change such as melting due to the heat generating in the cable during energization, and when the lowest temperature of the high-temperature-side temperature region is 175° C. or less, since there is no need to raise the extrusion molding temperature too high, it is effective in a sag problem, the thermal degradation problem, etc. during extrusion molding.

The lowest temperature of the high-temperature-side temperature region can vary according to the composition of the polypropylene resin (A). When the polypropylene resin (A) is a homo polypropylene or block polypropylene, since the melting point of the polypropylene resin (A) becomes high on the order of 155° C. or more to 175° C. or less, it is possible to control the lowest temperature of the high-temperature-side temperature region to be higher, for example, possible to control to 175° C. or less. In addition, when the polypropylene resin (A) is a random polypropylene, since the melting point of the polypropylene resin (A) is on the order of 135° C. or more to 155° C. or less, it is possible to control the lowest temperature of the high-temperature-side temperature region to be low, for example, possible to control to 155° C. or less. In addition, when increasing the content of the styrene-based thermoplastic elastomer (B), there is a tendency for lowering the lowest temperature of the high-temperature-side temperature region. For this reason, by adjusting the composition of the polypropylene resin (A) and the content of the styrene-based thermoplastic elastomer (B), it is possible to control to the desired lowest temperature of the high-temperature-side temperature region.

In addition, in the high-temperature-side temperature region, the highest temperature in the range of loss tangent tan δ of 0.1 or more to 0.3 or less is preferably 160° C. or more, more preferably 170° C. or more, and even more preferably 180° C. or more. This highest temperature is lower than the highest temperature of the high-temperature-side temperature region. When the highest temperature in the range of loss tangent tan δ of 0.1 or more to 0.3 or less is 160° C. or more, molding is possible without generating sag during extrusion molding.

In addition, in the temperature characteristic curve of the loss tangent tan δ, the loss tangent tan δ at 90° C. is preferably less than 0.1. In other words, in the temperature characteristic curve of the loss tangent tan δ, 90° C. is preferably within the low-temperature-side temperature region. When the loss tangent tan δ at 90° C. is less than 0.1, it is effective since there is no molecular structure change due to the heat generated in the cable during energization. In addition, the loss tangent tan δ may temporarily rise by scissoring reaction of pseudo-crosslinking of the styrene-based elastomer near 100° C. Since having no such behavior is favorable, the loss tangent tan δ at 100° C. is preferably less than 0.1 in the temperature characteristic curve of the loss tangent tan δ. In addition, from the viewpoint of glass transition temperature, in the temperature characteristic curve of the loss tangent tan δ, the loss tangent tan δ at 80° C. is preferably less than 0.1. However, even if there is some molecular structure change like this, because it has no impact on the sag performance in the high-temperature region which is the melted state, insulating performance after molding, etc., it is not the case.

The temperature characteristic curve of the loss tangent tan δ can be obtained by dynamic viscoelasticity measurement at a frequency of 100 rad/s relative to the insulating resin composition. The dynamic viscoelasticity measurement is carried out using a viscoelasticity measuring instrument (Physica MCR 301 manufactured by Anton Paar GmbH), at a frequency of 100 rad/s, at a measurement temperature of 25° C. or more and 250° C. or less with a temperature rising rate of 5° C./min, on the sheet-like insulating resin composition with thickness of 2 mm.

In addition, the insulating resin composition can have sufficient flexibility and electrical insulation property, even without containing oily liquids such as mineral oils and phenyl-derived oils, for example, naphthalene oil, aromatic oil, paraffin oil and polyaromatic oil either independently or by combining two or more types; however, in order to further improve the flexibility and the electrical insulation property, it may contain the above-mentioned oily liquid to an extent not decreasing the sag resistance property. The content proportion of an oily liquid contained in the insulating resin composition is preferably 0% by mass or more and 25% by mass or less, more preferably 0% by mass or more and 15% by mass or less, and even more preferably 0% by mass or more and 5% by mass or less.

In addition, the insulating resin composition can have sufficient flexibility and electrical insulation property even without containing a filler component such as zinc oxide, magnesium oxide, silica, carbon, fullerene either independently or by combining two or more types; however, in order to further improve the flexibility or electrical insulation property, the above-mentioned filler component may be contained in an extent not decreasing the sag resistance. The content proportion of the filler component contained in the insulating resin composition is preferably 0% by mass or more and 20% by mass or less, more preferably 0% by mass or more and 10% by mass or less, and even more preferably 0% by mass or more and 5% by mass or less.

In addition, the insulating resin composition can have sufficient flexibility and electrical insulation property even without containing at least one of a thermoplastic resin having a melting point of 50 to 200° C. such as polyethylene, polyvinyl acetate or polystyrene, and a modified resin of this thermoplastic resin either independently or by combining two or more types; however, in order to further improve the flexibility or electrical insulation property, the insulating resin composition may contain at least one of the above-mentioned thermoplastic resin and the modified resin of the above-mentioned thermoplastic resin in an extent not decreasing the sag resistance. The total content proportion of the thermoplastic resin and the modified resin contained in the insulating resin composition is preferably 0.1% by mass or more and 25.0% by mass or less, more preferably 1% by mass or more and 20% by mass or less, and even more preferably 5% by mass or more and 10% by mass or less.

In addition, the insulating resin composition can have sufficient heat resistance and electrical insulation property, even without containing and crosslinking a crosslinking agent such as di-t-hexyl peroxide (Perhexyl D, manufactured by NOF Corporation), dicumyl peroxide (Percumyl D, manufactured by NOF Corporation), 2,5-dimethyl-2,5-di(t-butylperoxy)hexane (Perhexa 25B, manufactured by NOF Corporation), α,α'-di(t-butylperoxy)diisopropylbenzene (Perbutyl P, manufactured by NOF Corporation), t-butyl cumyl peroxide (Perbutyl C, manufactured by NOF Corporation), and di-t-butyl peroxide (Perbutyl D, manufactured by NOF Corporation) either independently or by combining two or more types; however, in order to further improve the heat resistance or electrical insulation property, the above-mentioned crosslinking agent may be contained and crosslinked in an extent not decreasing the heat resistance and electrical insulation property. Furthermore, by mixing a small amount of the crosslinking agent and partially crosslinking the crosslinking agent, an improvement in mechanical properties such as bendability, improvement in heat resistance, etc. become possible. In addition, it is possible to improve the electrical insulation property by the composition of the crosslinking agent selected. The content proportion of the crosslinking agent contained in the insulating resin composition is preferably 0.1% by mass or more and 5.0% by mass or less, and more preferably 0.5% by mass or more and 3.0% by mass or less.

The insulating resin composition crosslinked by the crosslinking agent is a cross-linked insulating resin composition, and the insulating resin composition not crosslinked by a crosslinking agent is a non-crosslinked insulating resin composition.

In addition, the insulating resin composition may contain, as a stabilizing agent, a hindered phenolic antioxidant, thioether antioxidant, or a mixture selecting at least two types of these antioxidants in an extent not decreasing the heat resistance, the electrical insulation property and the sag resistance.

The hindered phenolic antioxidant is preferably tetrakis [methylene-3-(3',5'-di-t-butyl-4'-hydroxyphenyl)propionate]methane (Irganox 1010 manufactured by BASF), 1,6-hexanediol-bis[3-(3,5-di-t-butyl-4-hydroxyphenyl) propionate] (Irganox 259 manufactured by BASF), octadecyl-3-(3,5-di-t-butyl-4-hydroxyphenyl)propionate (Irganox 1076 manufactured by BASF), or isooctyl-3-(3,5-di-t-butyl-4-hydroxyphenyl)propionate (Irganox 1135 manufactured by BASF), and is more preferably tetrakis [methylene-3-(3',5'-di-t-butyl-4'-hydroxyphenyl)propionate]methane. These can be used independently or by combining two or more types.

The thioether antioxidant is preferably 4,4'-thiobis-(3-methyl-6-t-butylphenol) (Seenox BCS manufactured by Cipro Kasei), or 2,2'-thiobis-(4-methyl-6-t-butylphenol) (Irganox 1081 manufactured by BASF), and is more preferably 4,4'-thiobis-(3-methyl-6-t-butylphenol). These can be used independently or by combining two or more types.

The content proportion of the stabilizing agent contained in the insulating resin composition is preferably 0.01% by mass or more and 10.00% by mass or less, and is more preferably 0.20% by mass or more and 1.0% by mass or less. When the content proportion of the stabilizing agent is 0.01% by mass or more, it is possible to improve the heat resistance of the insulating resin composition. When the content proportion of the stabilizing agent is 10.00% by mass or less, it is possible to improve the electrical insulation property of the insulating resin composition.

From the viewpoint of, without a crosslinking treatment, superiority in flexibility and electrical insulation property, and suppressing thermal deformation and sag due to molecular fluctuation such as when heat is applied, the polypropylene resin (A) is preferably a homo polypropylene; a random polypropylene containing a constituent unit derived from ethylene and a constituent unit derived from a C3 to C30 α-olefin; or a block polypropylene containing a homo polypropylene, a constituent unit derived from ethylene, and a constituent unit derived from a C3 to C30 α-olefin, is more preferably a random polypropylene containing a constituent unit derived from ethylene and a constituent unit derived from a C3 to C30 α-olefin; or a block polypropylene containing a homo polypropylene, a constituent unit derived from ethylene, and a constituent unit derived from a C3 to C30 α-olefin, and is even more preferably a random polypropylene containing a constituent unit derived from ethylene and a constituent unit derived from a C3 to C30 α-olefin.

The constituent unit that is derived from ethylene and constitutes the random polypropylene is preferably ethylene. The constituent unit that is derived from a C3 to C30 α-olefin and constitutes the random polypropylene is preferably propylene or butene.

For the constituent unit (E) derived from ethylene and the constituent unit (O) derived from a C3 to C30 α-olefin, that constitute the random polypropylene, the ratio (E/O) of the constituent unit (E) derived from ethylene relative to the constituent unit (O) derived from a C3 to C30 α-olefin is preferably 0 or more, more preferably 0.001 or more, and even more preferably 0.010 or more. If the ratio (E/O) of the random polypropylene is within the above-mentioned range, it is possible to improve the compatibility with the styrene-based thermoplastic elastomer (B).

The constituent unit that is derived from ethylene and constitutes the block polypropylene is preferably ethylene. The constituent unit that is derived from a C3 to C30 α-olefin and constitutes the block polypropylene is preferably propylene or butene.

For the constituent unit (E) derived from ethylene and the constituent unit (O) derived from a C3 to C30 α-olefin, that constitute the block polypropylene, the ratio (E/O) of the constituent unit (E) derived from ethylene relative to the constituent unit (O) derived from a C3 to C30 α-olefin is preferably 0 or more, more preferably 0.001 or more, and even more preferably 0.010 or more. If the ratio (E/O) of the block polypropylene is within the above-mentioned range, it is possible to improve the compatibility with the styrene-based thermoplastic elastomer (B). In addition, the ratio (E/O) of the block polypropylene is preferably 0.250 or less, more preferably 0.120 or less, and even more preferably 0.055 or less. If the ratio (E/O) of the block polypropylene is within the above-mentioned range, it is possible to suppress the thermal deformation due to molecular fluctuation when heat is applied.

The content ratio of the polypropylene resin (A) and the styrene-based thermoplastic elastomer (B) contained in the insulating resin composition is preferably 20.0 to 55.0:45.0 to 80.0 by % by mass of the polypropylene resin (A): the styrene-based thermoplastic elastomer (B).

Thereamong, for the content ratio of the polypropylene resin (A):the styrene-based thermoplastic elastomer (B), the polypropylene resin (A) is more preferably 30.0% by mass or more, and even more preferably 35.0% by mass or more. When the polypropylene resin (A) is within the above-mentioned range, although it depends on the shape of the polypropylene resin (A), overtorque during extrusion and bridging under the hopper, cracking of the molded product and whitening are less likely to occur.

In addition, among the above, for the content ratio of the polypropylene resin (A):the styrene-based thermoplastic elastomer (B), the polypropylene resin (A) is more preferably 45.0% by mass or less. When the polypropylene resin (A) is within the above-mentioned range, it is possible to improve the flexibility and the electrical insulation property of the insulating resin composition and to suppress the sag during molding of the insulating resin composition, without conducting crosslinking treatment.

In addition, among the above, for the content ratio of the polypropylene resin (A):the styrene-based thermoplastic elastomer (B), the styrene-based thermoplastic elastomer (B) is more preferably 40.0% by mass or more, even more preferably 42.5% by mass or more, and particularly preferably 45.0% by mass or more. When the styrene-based thermoplastic elastomer (B) is within the above-mentioned range, it is possible to improve the flexibility and the electrical insulation property of the insulating resin composition and to suppress the sag of the insulating resin composition, without carrying out crosslinking treatment.

In addition, among the above, for the content ratio of the polypropylene resin (A):the styrene-based thermoplastic elastomer (B), the styrene-based thermoplastic elastomer (B) is more preferably 70.0% by mass or less, and even more preferably 65.0% by mass or less. When the styrene-based thermoplastic elastomer (B) is within the above-mentioned range, although it depends on the shape of the styrene-based thermoplastic elastomer (B), overtorque during extrusion and bridging under the hopper, and cracking of the molded product are less likely to occur. In addition to that, it is possible to improve the flexibility and the electrical insulation property of the insulating resin composition and to suppress the sag of the insulating resin composition, without carrying out crosslinking treatment.

In addition, the content proportion of styrene contained in the insulating resin composition is preferably 10% by mass or more and 30% by mass or less, more preferably 12.5% by mass or more and 25% by mass or less, and even more preferably 15% by mass or more and 20% by mass or less. When the content proportion of styrene is within the above-mentioned range, the compatibility with the polypropylene increases, and it is possible to improve the flexibility and the electrical insulation property of the insulating resin composition and to suppress the sag of the insulating resin composition, without carrying out crosslinking treatment.

From the viewpoint of superiority in flexibility and electrical insulation property and suppressing sag without conducting crosslinking treatment, the styrene-based thermoplastic elastomer (B) preferably contains a constituent unit derived from styrene, and contains at least one of a constituent unit derived from ethylene and a constituent unit derived from a C3 to C30 α-olefin.

The constituent unit that is derived from styrene and constitutes the styrene-based thermoplastic elastomer (B) is preferably styrene. The constituent unit that is derived from ethylene and constitutes the styrene-based thermoplastic elastomer (B) is preferably ethylene. The constituent unit that is derived from a C3 to C30 α-olefin and constitutes the styrene-based thermoplastic elastomer (B) is preferably propylene or butene.

When establishing the total of the constituent unit derived from styrene, the constituent unit derived from ethylene, and the constituent unit derived from a C3 to C30 α-olefin that constitute the styrene-based thermoplastic elastomer (B) as 100% by mass, the constituent unit derived from styrene is preferably 10% by mass or more, more preferably 15.0% by mass or more, and even more preferably 20.0% by mass or more. When the above-mentioned constituent unit derived from styrene is 10% by mass or more, it is possible to improve the flexibility and the electrical insulation property of the insulating resin composition without carrying out crosslinking treatment.

In addition, when establishing the total of the constituent unit derived from styrene, the constituent unit derived from ethylene, and the constituent unit derived from a C3 to C30 α-olefin that constitute the styrene-based thermoplastic elastomer (B) as 100% by mass, the constituent unit derived from styrene is preferably 60.0% by mass or less, more preferably 50.0% by mass or less, and even more preferably 40.0% by mass or less. When the above-mentioned constituent unit derived from styrene is 60.0% by mass or less, since the grand total of the constituent unit derived from ethylene and the constituent unit derived from a C3 to C30 α-olefin which are other than the constituent unit derived from styrene become 40.0% by mass or more, the compatibility with the polypropylene resin (A) improves, and it is possible to improve the flexibility and the electrical insulation property of the insulating resin composition and to suppress the sag of the insulating resin composition, without carrying out crosslinking treatment.

In addition, when establishing the total of the constituent unit derived from styrene, the constituent unit derived from ethylene, and the constituent unit derived from a C3 to C30 α-olefin that constitute the styrene-based thermoplastic elastomer (B) as 100% by mass, the constituent unit derived from ethylene is preferably 20.0% by mass or more, more preferably 30.0% by mass or more, and even more preferably 40.0% by mass or more. When the above-mentioned constituent unit derived from ethylene is 20.0% by mass or more, since the compatibility with the polypropylene resin (A) improves, and it is possible to improve the flexibility and the electrical insulation property of the insulating resin composition and to suppress the sag of the insulating resin composition, without carrying out crosslinking treatment.

In addition, when establishing the total of the constituent unit derived from styrene, the constituent unit derived from ethylene, and the constituent unit derived from a C3 to C30 α-olefin that constitute the styrene-based thermoplastic elastomer (B) as 100% by mass, the constituent unit derived from ethylene is preferably 70.0% by mass or less, more preferably 67.5% by mass or less, and even more preferably 60.0% by mass or less. When the above-mentioned constituent unit derived from ethylene is 60.0% by mass or less, since the thermal deformation due to molecular fluctuation such as when heat is applied is less likely to occur while maintaining compatibility with the polypropylene resin (A), it is possible to improve the flexibility and the electrical insulation property of the insulating resin composition and to suppress the sag of the insulating resin composition, without carrying out crosslinking treatment.

In addition, when establishing the total of the constituent unit derived from styrene, the constituent unit derived from ethylene, and the constituent unit derived from a C3 to C30 α-olefin that constitute the styrene-based thermoplastic elastomer (B) as 100% by mass, the constituent unit derived from a C3 to C30 α-olefin is preferably 10.0% by mass or more, more preferably 12.5% by mass or more, and even more preferably 15.0% by mass or more. When the above-mentioned constituent unit derived from a C3 to C30 α-olefin is 10.0% by mass or more, since the heat resistance and the compatibility with the polypropylene resin (A) improve, it is possible to further improve the flexibility and the electrical insulation property of the insulating resin composition and to further suppress the sag of the insulating resin composition, without carrying out crosslinking treatment.

In addition, when establishing the total of the constituent unit derived from styrene, the constituent unit derived from ethylene, and the constituent unit derived from a C3 to C30 α-olefin that constitute the styrene-based thermoplastic elastomer (B) as 100% by mass, the constituent unit derived from a C3 to C30 α-olefin is preferably 45.0% by mass or less, more preferably 42.5% by mass or less, and even more preferably 40.0% by mass or less. When the above-mentioned constituent unit derived from a C3 to C30 α-olefin is 40.0% by mass or less, since the thermal deformation due to molecular fluctuation such as when heat is applied is less likely to occur while maintaining the heat resistance and maintaining the compatibility with the polypropylene resin (A), it is possible to further improve the flexibility and the electrical insulation property of the insulating resin composition and to further suppress the sag of the insulating resin composition, without carrying out crosslinking treatment.

In addition, the insulating resin composition may contain various additives, in addition to the polypropylene resin (A) and the styrene-based thermoplastic elastomer (B), so long as a decline in flexibility, the electrical insulation property, the thermal deformation and the sag resistance does not occur, without carrying out crosslinking treatment.

For the insulating resin composition, the dielectric loss tangent when applying an AC electric field of 30 kV/m at 90° C. is preferably 0.15% or less, more preferably 0.10% or less, and even more preferably 0.05% or less.

The dielectric loss tangent is the electrical energy loss inside the insulator, and is an index evaluating the insulation performance with AC electric power. When applying AC voltage to the insulator, by molecules in the insulator vibrating, a phenomenon called dielectric loss occurs in that a part of the electrical energy changes to thermal energy inside the insulator, and the insulator heats up. As a standard for the electrical energy loss on this occasion, the dielectric loss tangent (ratio of current charged to current lost) is used.

For this reason, when the above-mentioned dielectric loss tangent of the insulating resin composition is 0.15% or less, it is possible to improve the flexibility and the electrical insulation property of the insulating resin composition and to suppress the sag of the insulating resin composition, without carrying out crosslinking treatment. Furthermore, the insulating resin composition can be better used in an electric power cable for high-voltage use, as the above-mentioned dielectric loss tangent becomes lower.

In addition, for the insulating resin composition, the ratio (Q300/Q0) of electric charge amount (Q300) after 5 minutes when applying a DC electric field of 30 kV/mm at 90° C. relative to the initial electric charge amount (Q0) is preferably 2.00 or less, more preferably 1.75 or less, even more preferably 1.50 or less, and most preferably 1.00.

The ratio (Q300/Q0), i.e. electrical charge storage rate, is an index evaluating the insulation performance with DC electric power, and is measured by the Q(t) method (current integration method). The Q(t) method is a method of evaluating the presence/absence of electrical charge storage within the insulator, based on the integrated charge quantity characteristic $Q(t)=\int I(t)dt$ obtained by the time integration of electric current I(t). In the case of the integrated charge quantity being $Q(t)=Cs\cdot Vdc$ (Cs: electrostatic capacity of insulator, Vdc: applied DC voltage), it suggests that electrical charge storage within the insulator does not occur. In the case of the integrated charge quantity being $Q(t)>Cs\cdot Vdc$, it suggests that electrical charge storage within the insulator does occurs. If electrical charge storage within the insulator occurs, the electric field distortion of the insulator will occur. When the electric field distortion is large, localized electric field concentration will occur in the insulator, which leads to insulation breakdown, and thus is not suited to a DC insulation material.

For this reason, when the above ratio (Q300/Q0) is 2.00 or less, it is possible to improve the flexibility and the electrical insulation property of the insulating resin composition and to suppress the sag of the insulating resin composition, without carrying out crosslinking treatment.

The production method of the above-mentioned insulating resin composition includes a step of kneading the polypropylene resin (A) and the styrene-based thermoplastic elastomer (B). By kneading the polypropylene resin (A) and the styrene-based thermoplastic elastomer (B), it is possible to produce the insulating resin composition. With the production method of the insulating resin composition, oil extension and crosslinking do not carried out.

The insulating resin composition obtained by such a production method can be favorably used in an electric power cable and an electric power cable connecting part for which high flexibility and electrical insulation property as well as suppression of thermal deformation and sag are sought without carrying a crosslinking treatment.

Figure 3:
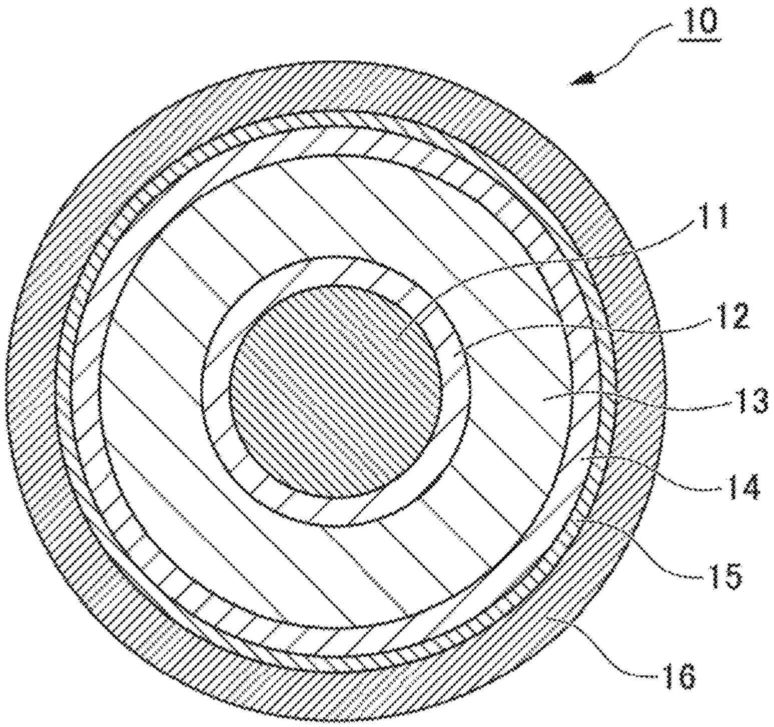
FIG. 3 is a lateral cross-sectional view showing an example of an electric power cable including the insulating resin composition for electric power cable according to an embodiment.

FIG. 3 is a lateral cross-sectional view showing an example of an electric power cable including the insulating resin composition according to the embodiment.

As shown in FIG. 3, the electric power cable 10 includes at least a conductor 11, an internal semiconducting layer 12, an insulating layer 13 consisting of the above-mentioned insulating resin composition, and an external semiconducting layer 14. The internal semiconducting layer 12 covers the outer circumference of the conductor 11. The insulating layer 13 covers the outer circumference of the internal semiconducting layer 12. The external semiconducting layer 14 covers the outer circumference of the insulating layer 13.

In addition, the electric power cable 10 may further include a metal shielding layer 15 which covers the outer circumference of the external semiconducting layer 14. In addition, the electric power cable 10 may further include a sheath 16 covering the outer circumference of the metal shielding layer 15.

By extrusion molding the above-mentioned insulating resin composition together with the conductor 11 with the internal semiconducting layer 12 on the outer circumference, the insulating layer 13 covering the outer circumference of the internal semiconducting layer 12 is formed. Next, by a known method, it is possible to produce the electric power cable 10 by providing the external semiconducting layer 14, and further providing the metal shielding layer 15 and the sheath 16 as necessary.

Figure 4:
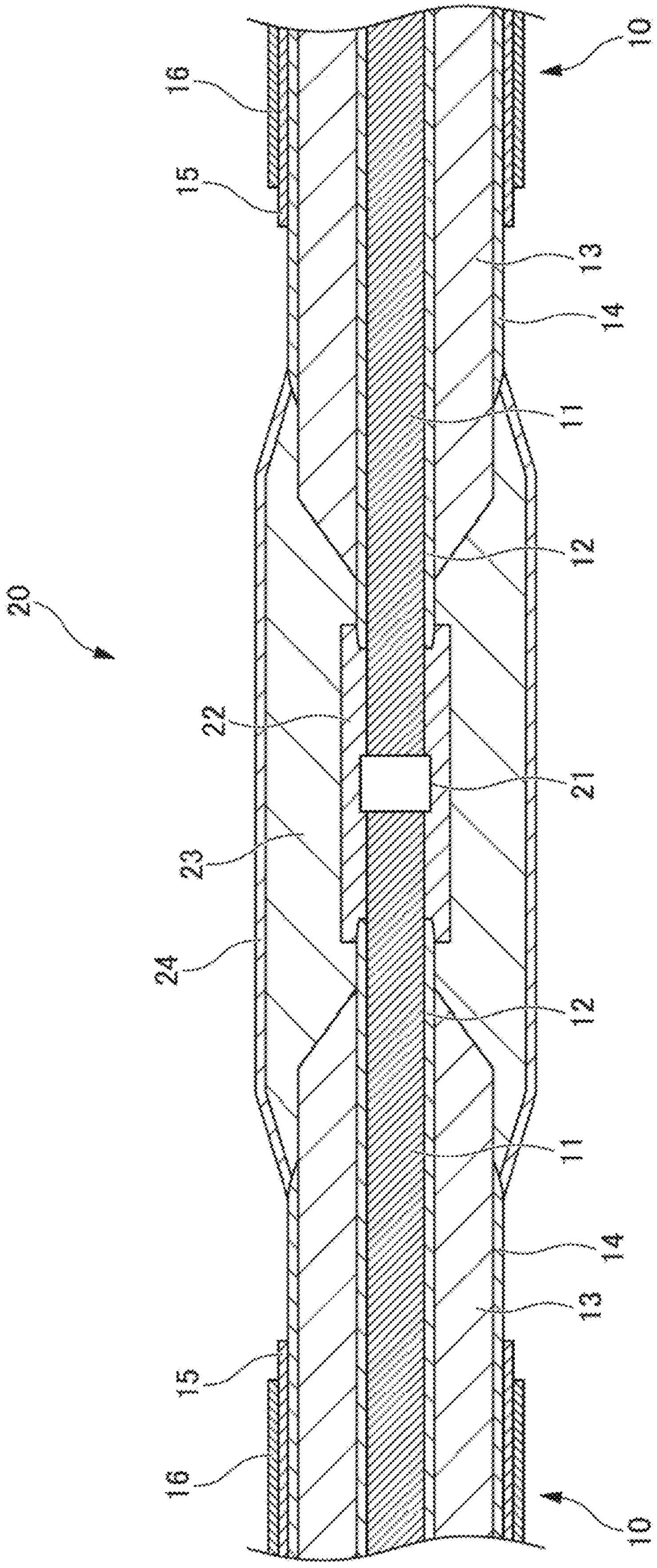
FIG. 4 is a longitudinal cross-sectional view showing an example of an electric power cable connecting part including the insulating resin composition for electric power cable according to an embodiment.

FIG. 4 is a longitudinal cross-sectional view showing an example of the electric power cable connecting part including the insulating resin composition according to the embodiment.

As shown in FIG. 4, the electric power cable connecting part 20 includes: a connecting part internal semiconducting layer 22 that covers a connecting part 21 connecting the conductor 11 of one electric power cable 10 with the conductor 11 of another electric power cable 10, an exposed portion of the conductor 11 of the one electric power cable 10, and an exposed portion of the conductor 11 of the other electric power cable 10; a connecting part insulating layer 23 consisting of the above-mentioned insulating resin composition which covers the outer circumference of the connecting part internal semiconducting layer 22; and a connecting part external semiconducting layer 24 which covers the outer circumference of the connecting part insulating layer 23.

The connecting part insulating layer 23 is formed by covering, with the above-mentioned insulating resin composition, the outer circumference of the connecting part internal semiconducting layer 22 that covers the connecting part 21 connecting the conductor 11 at the end of one electric power cable 10 exposed by the stripping process with the conductor 11 at the end of another electric power cable 10 exposed by the stripping process; an exposed portion of the conductor 11 of the one electric power cable 10 exposed by the stripping process; and an exposed portion of the conductor 11 of the other electric power cable 10 exposed by the stripping process. Next, by providing the connecting part external semiconducting layer 24 by a known method, it is possible to produce the electric power cable connecting part 20.

According to the above explained embodiment, by using the polypropylene resin (A) and the styrene-based thermoplastic elastomer (B) superior in compatibility with the polypropylene resin (A), without carrying out oil extension, and focusing on the temperature characteristic curve of the loss tangent tan δ obtained by dynamic viscoelastic measurement of the insulating resin composition, it is possible to produce without carrying out a crosslinking process, and improve the flexibility and the electrical insulation property, as well as being able to suppress the thermal deformation and the sag.

Although embodiments have been explained above, the present invention is not to be limited to the above embodiments, and encompasses every mode included in the scope of gist and claims of the present disclosure, and can be modified in various ways within the scope of the present disclosure.

EXAMPLES

Next, examples and comparative examples will be explained; however, the present disclosure is not to be limited to these examples.

Examples 1 to 24 and Comparative Examples 1 to 20

The insulating resin compositions of the compositions shown in Tables 1 to 3 were produced by kneading the raw materials including the polypropylene resin (A) and the styrene-based thermoplastic elastomer (B). More specifically, kneading was performed by a single axis extruder at an extruding temperature of 200° C. or more and 220° C. or less. After kneading, this was made into pellet form, and a sheet-like insulating resin composition having the desired thickness was prepared by conducting press molding on this at the temperature conditions of 200° C. or more and 220° C. or less.

randomPP: Prime Polypro B241 (random polypropylene manufactured by Prime Polymer Co., Ltd.)

homoPP: Prime Polypro B241 (homo polypropylene manufactured by Prime Polymer Co., Ltd.)

blockPP: Prime Polypro B241 (block polypropylene manufactured by Prime Polymer Co., Ltd.)

EVA: Levapren 600 (ethylene vinyl acetate copolymer manufactured by LANXESS AG)

SEEPSi: SEPTON 4077 (styrene-based elastomer (styrene-ethylene-ethylene-propylene-styrene copolymer), manufactured by Kuraray Co., Ltd.)

SEEPS2: SEPTON 4099 (styrene-based elastomer (styrene-ethylene-ethylene-propylene-styrene copolymer), manufactured by Kuraray Co., Ltd.)

SEPS1: SEPTON 2005 (styrene-based elastomer (styrene-ethylene-propylene-styrene copolymer), manufactured by Kuraray Co., Ltd.)

SEBS: SEPTON 8006 (styrene-based elastomer (styrene-ethylene-butylene-styrene copolymer), manufactured by Kuraray Co., Ltd.)

SEPS2: SEPTON 2006 (styrene-based elastomer (styrene-ethylene-propylene-styrene copolymer), manufactured by Kuraray Co., Ltd.)

SEPS3: SEPTON 2104 (styrene-based elastomer (styrene-ethylene-propylene-styrene copolymer), manufactured by Kuraray Co., Ltd.)

MAH modified homoPP: FUSABOND P613 (maleic-anhydride modified homo polypropylene, manufactured by Dow Chemical Co.)

HDPE: HI-ZEX 5000S (high-density polyethylene, manufactured by Prime Polymer Co., Ltd.)

LDPE: DXM-446 (low-density polyethylene, manufactured Dow Chemical Co.)

PS: Toyo styrol G100C (polystyrene, manufactured by Toyo Styrene Co., Ltd.)

PMMA: Parapet CW001 (methacrylic acid ester resin, manufactured by Kuraray Co., Ltd.)

Paraffinic process oil: SUNPAR 110 (manufactured by Japan Sun Oil Company, Ltd.)

$SiO_2$: QSG-10 (silica, manufactured by Shin-Etsu Chemical Co., Ltd.)

DCP: PERCUMYL D (dicumyl peroxide, manufactured by NOF Corp.)

TABLE 1

| | Polypropylene resin (A) (mass %) | | | Olefinic elastomer (mass %) | Styrene-based thermoplastic elastomer (B) (mass %) | | | | | | | |
|---|---|---|---|---|---|---|---|---|---|---|---|---|
| | | | | | | | | | | | Constituent unit derived from styrene | Constituent unit derived from ethylene |
| | random PP | hom oPP | blockPP | EVA | SEEPS 1 | SEEPS 2 | SEPS 1 | SEBS | SEPS 2 | SEPS 3 | (mass %) | (mass %) |
| Example 1 | 60 | — | — | — | 40 | — | — | — | — | — | 30 | 52.5 |
| Example 2 | 55 | — | — | — | 45 | — | — | — | — | — | 30 | 52.5 |
| Example 3 | 50 | — | — | — | 50 | — | — | — | — | — | 30 | 52.5 |
| Example 4 | 55 | — | — | — | 55 | — | — | — | — | — | 30 | 52.5 |
| Example 5 | 40 | — | — | — | 60 | — | — | — | — | — | 30 | 52.5 |
| Example 6 | 35 | — | — | — | 65 | — | — | — | — | — | 30 | 52.5 |
| Example 7 | 20 | — | — | — | 80 | — | — | — | — | — | 30 | 52.5 |
| Example 8 | 50 | — | — | — | — | 50 | — | — | — | — | 30 | 52.5 |
| Example 9 | 50 | — | — | — | — | — | 50 | — | — | — | 20 | 40.0 |
| Example 10 | 50 | — | — | — | — | — | — | 50 | — | — | 32 | 45.3 |
| Comparative Example 1 | 65 | — | — | — | 35 | — | — | — | — | — | 30 | 52.5 |

TABLE 1-continued

| | Polypropylene resin (A) (mass %) | | | Olefinic elastomer (mass %) | Styrene-based thermoplastic elastomer (B) (mass %) | | | | | | | |
|---|---|---|---|---|---|---|---|---|---|---|---|---|
| | | | | | | | | | | | Constituent unit derived from styrene | Constituent unit derived from ethylene |
| | random PP | hom oPP | blockPP | EVA | SEEPS 1 | SEEPS 2 | SEPS 1 | SEBS | SEPS 2 | SEPS 3 | (mass %) | (mass %) |
| Comparative Example 2 | 65 | — | — | — | — | — | — | 35 | — | — | 32 | 51.0 |
| Comparative Example 3 | 80 | — | — | — | 20 | — | — | — | — | — | 30 | 52.5 |
| Comparative Example 4 | 80 | — | — | — | — | — | — | 20 | — | — | 32 | 51.0 |
| Comparative Example 5 | 50 | — | — | — | — | — | — | — | 50 | — | 34 | 33.0 |
| Comparative Example 6 | 50 | — | — | — | — | — | — | — | — | 50 | 65 | 17.5 |
| Comparative Example 7 | 35 | — | — | — | — | — | — | — | — | 65 | 65 | 17.5 |

TABLE 2

| | Polypropylene resin (A) (mass %) | | | Olefinic elastomer (mass %) | Styrene-based thermoplastic elastomer (B) (mass %) | | | | | | | |
|---|---|---|---|---|---|---|---|---|---|---|---|---|
| | | | | | | | | | | | Constituent unit derived from styrene | Constituent unit derived from ethylene |
| | random PP | hom oPP | blockPP | EVA | SEEPS 1 | SEEPS 2 | SEPS 1 | SEBS | SEPS 2 | SEPS 3 | (mass %) | (mass %) |
| Example 11 | — | 50 | — | — | 50 | — | — | — | — | — | 30 | 52.5 |
| Example 12 | — | 50 | — | — | — | — | 50 | — | — | — | 20 | 40.0 |
| Example 13 | — | 50 | — | — | — | — | — | 50 | — | — | 32 | 45.3 |
| Example 14 | — | — | 50 | — | 50 | — | — | — | — | — | 30 | 52.5 |
| Example 15 | — | 40 | — | 10 | 50 | — | — | — | — | — | 30 | 52.5 |
| Comparative Example 8 | — | 65 | — | — | — | — | 35 | — | — | — | 20 | 40.0 |
| Comparative Example 9 | — | 65 | — | — | — | — | — | 35 | — | — | 32 | 51.0 |

TABLE 3

| | Poly-propylene | Styrene-based thermoplastic elastomer (B) (mass %) | | | Other | | | | | | | | |
|---|---|---|---|---|---|---|---|---|---|---|---|---|---|
| | resin (A) (mass %) random PP | SEEPS 1 | Constituent unit derived from styrene (mass %) | Constituent unit derived from ethylene (mass %) | MAH modified hom oPP | EVA | HDPE | LDPE | PS | PMMA | Paraffinic process oil | $SD_2$ | DCP (cross-linking agent) |
| Example 16 | 30.0 | 45.0 | 30 | 52.5 | 25 | — | — | — | — | — | — | — | — |
| Example 17 | 30.0 | 45.0 | 30 | 52.5 | — | 25 | — | — | — | — | — | — | — |
| Example 18 | 30.0 | 45.0 | 30 | 52.5 | — | — | 25 | — | — | — | — | — | — |
| Example 19 | 30.0 | 45.0 | 30 | 52.5 | — | — | — | 25 | — | — | — | — | — |
| Example 20 | 30.0 | 45.0 | 30 | 52.5 | — | — | — | — | 25 | — | — | — | — |
| Example 21 | 30.0 | 45.0 | 30 | 52.5 | — | — | — | — | — | 25 | — | — | — |
| Example 23 | 30.0 | 45.0 | 30 | 52.5 | — | — | — | — | — | — | — | 25 | — |
| Example 24 | 50.0 | 50.0 | 30 | 52.5 | — | — | — | — | — | — | — | — | 5 |
| Comparative Example 10 | 60 | — | — | — | — | 40 | — | — | — | — | — | — | — |
| Comparative Example 11 | 70 | — | — | — | — | 25 | — | — | — | — | — | 5 | — |
| Comparative Example 12 | 50 | — | — | — | — | 25 | — | — | — | — | — | 25 | — |
| Comparative Example 13 | 60 | — | — | — | — | — | 40 | — | — | — | — | — | — |

TABLE 3-continued

| | Polypropylene | Styrene-based thermoplastic elastomer (B) (mass %) | | | Other | | | | | | | | |
|---|---|---|---|---|---|---|---|---|---|---|---|---|---|
| | resin (A) (mass %) random PP | SEEPS 1 | Constituent unit derived from styrene (mass %) | Constituent unit derived from ethylene (mass %) | MAH modified hom oPP | EVA | HDPE | LDPE | PS | PMMA | Paraffinic process oil | $SD_2$ | DCP (cross-linking agent) |
| Comparative Example 14 | 60 | — | — | — | — | — | — | 40 | — | — | — | — | — |
| Comparative Example 15 | 75 | — | — | — | — | — | — | — | 25 | — | — | — | — |
| Comparative Example 16 | 75 | — | — | — | — | — | — | — | — | — | 25 | — | — |
| Comparative Example 17 | 75 | — | — | — | — | — | — | — | — | — | — | 25 | — |
| Comparative Example 18 | — | 50 | 30 | 52.5 | — | 50 | — | — | — | — | — | — | — |
| Comparative Example 19 | — | 50 | 30 | 52.5 | — | — | 50 | — | — | — | — | — | — |
| Comparative Example 20 | — | 50 | 30 | 52.5 | — | — | — | 50 | — | — | — | — | — |

(Measurement and Evaluation)

The following measurement and evaluation were conducted on the insulating resin compositions obtained in the above Examples and Comparative Examples. The results are shown in Tables 4 to 6.

(1) Temperature Characteristic Curve of Loss Tangent Tan δ

Using a viscoelasticity measuring instrument (Physica MCR 301 manufactured by Anton Paar GmbH), the dynamic viscoelasticity measurement of the sheet-like insulating resin composition with a thickness of 2 mm was performed at a frequency of 100 rad/s, at a measurement temperature of 25° C. or more and 250° C. or less at a temperature rising rate of 5° C./min., whereby the temperature characteristic curve of the loss tangent tan δ was obtained.

(2) Dielectric Loss Tangent

A guard electrode and a measurement electrode were provided on the same surface of the sheet-like insulating resin composition with a thickness of 0.1 mm to 3.0 mm immersed in silicone oil within a constant temperature bath of 90° C., and the dielectric loss tangent of the insulating resin composition was measured when applying an AC electric field of 30 kV/mm.

(3) Ratio (Q300/Q0)

Using a Q(t) meter (AD-9832A manufactured by A&D Co., Ltd.), the electrical charge storage rate of the sheet-like insulating resin composition with a thickness of 0.1 mm to 3.0 mm was measured by the Q(t) method at 90° C. with a DC electric field of 30 kV/mm to obtain the electric charge amount (Q300) after 5 min. Then, the ratio (Q300/Q0) of the electric charge amount (Q300) relative to the initial electric charge amount (Q0) was calculated.

(4) Sag Resistance

In a state where an end of a test piece with dumbbell No. 3 shape and a thickness of 2 mm described in JIS K 6251-2017 consisting of the insulating resin composition was fixed to hang in a constant temperature bath, after leaving for a predetermined time at a predetermined temperature, the presence/absence of stretch of the insulating resin composition was observed.

More specifically, first, after heating the insulating resin composition in a state hanging in the constant temperature bath and leaving for 10 minutes at 170° C., the presence/absence of stretch of the insulating resin composition was observed. In the case of performing this test three times, and stretch being observed in the insulating resin composition, the sag resistance was determined as none. In the case of performing this test three times, and stretch not being observed in the insulating resin composition, after heating the insulating resin composition in a state hanging in the constant temperature bath at 170° C. and leaving for 10 minutes at 180° C., the presence/absence of stretch of the insulating resin composition was observed. In the case of performing this test three times, and stretch being observed in the insulating resin composition, the sag resistance was determined as none. In the case of performing this test three times, and stretch not being observed in the insulating resin composition, after heating the insulating resin composition in a state hanging in the constant temperature bath at 180° C. and leaving for 10 minutes at 190° C., the presence/absence of stretch of the insulating resin composition was observed. In the case of performing this test three times, and stretch being observed in the insulating resin composition, the sag resistance was determined as none. In the case of performing this test three times, and stretch not being observed in the insulating resin composition, after heating the insulating resin composition in a state hanging in the constant temperature bath at 190° C. and leaving for 10 minutes at 200° C., the presence/absence of stretch of the insulating resin composition was observed. In the case of performing this test three times, and stretch being observed in the insulating resin composition, the sag resistance was determined as none. In the case of performing this test three times, and stretch not being observed in the insulating resin composition, the sag resistance was determined as present. The assumed temperature during extrusion molding is 200° C.

(5) Thermal Deformation (Heat Resistance)

After placing the insulating resin composition of 15 mm length, 30 mm width and 2 mm thickness on a rod of semicircular shape with 5 mm radius and approximately 35 mm length, the insulating resin composition was heated for 30 minutes at 140° C., then the insulating resin composition was further heated for 30 minutes at 140° C. while a load of 1 kg being applied, and the thickness of the insulating resin composition was measured to calculate the rate of decrease. If the rate of decrease was less than 10%, it was said to have passed.

(6) Tensile Modulus (Flexibility)

In order to investigate the softness of the insulating resin composition, the tensile modulus was measured based on the tensile test of JIS K6921-2:2010. Materials with large tensile modulus have low strain due to stress, and are expressed as "hard", and materials with low tensile modulus are expressed as "soft", and herein, the tensile modulus of 500 MPa or less was defined as a soft material, and approved as an insulating material for electric power cable.

(7) Space Charge (DC Characteristic)

Using a space charge measurement instrument (manufactured by Five Lab Co., Ltd.), the space charge of the sheet-like insulating resin composition of 50 mm length, 50 mm width and 0.3 mm thickness was measured by the pulse electrostatic stress method (PEA method) at 90° C., with applied voltage of 9 kV and measurement time of 24 h, and the presence/absence of electric field distortion was checked.

In the space charge measurement, whether or not the behavior of charge in the insulating resin composition was stable over a long time was determined. If the behavior of charge was stable over a long time, since the local electric field distortion did not occur in the insulating resin composition, the insulating resin composition is favorable as a DC insulating material.

TABLE 4

| | Component ratio derived from styrene-based elastomer in mixture | | Lowest temperature of high-temperature-side temperature region (° C.) | Highest temperature of high-temperature-side temperature region (° C.) | Highest temperature in which loss tangent tan δ was 0.1 to 0.3 (° C.) | Loss tangent tan δ at 90° C. | Presence/absence of low-temperature-side temperature region | Loss tangent tan δ | | Sag resistance | Heating deformation rate | Tensile modulus (MPa) | Dielectric loss tangent | Ratio (Q300/Q0) | Space charge |
|---|---|---|---|---|---|---|---|---|---|---|---|---|---|---|---|
| | Styrene ratio (%) | Ethylene ratio (%) | | | | | | 125 ± 35° C. | 200 ± 45° C. | | | | | | |
| Example 1 | 12.0 | 21.0 | 135 | 245 | 186.0 | 0.07 | Present | ≥0.1 | ≤0.3 | Present | Less than 10% | 450 | 0.08 | 1.2 | Absent |
| Example 2 | 13.5 | 23.6 | 133 | 249 | 202.7 | 0.07 | Present | ≥0.1 | ≤0.3 | Present | Less than 10% | 350 | 0.08 | 1.1 | Absent |
| Example 3 | 15.0 | 26.3 | 131 | 250 | 249.9 | 0.08 | Present | ≥0.1 | ≤0.3 | Present | Less than 10% | 250 | 0.05 | 1.3 | Absent |
| Example 4 | 16.5 | 28.9 | 127 | 250 | 249.9 | 0.07 | Present | ≥0.1 | ≤0.3 | Present | Less than 10% | 220 | 0.04 | 1.4 | Absent |
| Example 5 | 18.0 | 31.5 | 122 | 280 | 280.0 | 0.08 | Present | ≥0.1 | ≤0.3 | Present | Less than 10% | 200 | 0.04 | 1.2 | Absent |
| Example 6 | 19.5 | 34.1 | 119 | 290 | 290.0 | 0.09 | Present | ≥0.1 | ≤0.3 | Present | Less than 10% | 180 | 0.04 | 1.4 | Absent |
| Example 7 | 24.0 | 42.0 | 115 | 300 | 300.0 | 0.06 | Present | ≥0.1 | ≤0.3 | Present | Less than 10% | 170 | 0.04 | 1.3 | Absent |
| Example 8 | 15.0 | 26.3 | 128 | 249 | 249.1 | 0.06 | Present | ≥0.1 | ≤0.3 | Present | Less than 10% | 300 | 0.05 | 1.2 | Absent |
| Example 9 | 10.0 | 20.0 | 140 | 249 | 249.3 | 0.08 | Present | ≥0.1 | ≤0.3 | Present | Less than 10% | 300 | 0.10 | 1.6 | Absent |
| Example 10 | 16.0 | 22.7 | 138 | 250 | 249.9 | 0.09 | Present | ≥0.1 | ≤0.3 | Present | Less than 10% | 300 | 0.05 | 1.5 | Absent |
| Comparative Example 1 | 10.5 | 18.4 | 136 | 239 | 172.3 | 0.11 | Present | ≥0.1 | ≥0.3 | Absent | Less than 10% | 500 | 0.15 | 1.3 | Present |
| Comparative Example 2 | 11.2 | 17.9 | 125 | 235 | 177.4 | 0.11 | Present | ≥0.1 | ≥0.3 | Absent | Less than 10% | 550 | 0.20 | 1.5 | Present |
| Comparative Example 3 | 6.0 | 10.5 | 135 | 238 | 172.2 | 0.12 | Present | ≥0.1 | ≥0.3 | Absent | Less than 10% | 600 | 0.18 | 1.4 | Present |
| Comparative Example 4 | 6.4 | 10.2 | 132 | 235 | 176.3 | 0.11 | Present | ≥0.1 | ≥0.3 | Absent | Less than 10% | 650 | 0.15 | 1.5 | Present |

TABLE 4-continued

| | Component ratio derived from styrene-based elastomer in mixture | | | | | | | Loss tangent tan δ | | | | | | | |
|---|---|---|---|---|---|---|---|---|---|---|---|---|---|---|---|
| | Styrene ratio (%) | Ethylene ratio (%) | Lowest temperature of high-temperature-side temperature region (° C.) | Highest temperature of high-temperature-side temperature region (° C.) | Highest temperature in which loss tangent tan δ was 0.1 to 0.3 (° C.) | Loss tangent tan δ at 90° C. | Presence/absence of low-temperature-side temperature region | 125 ± 35° C. | 200 ± 45° C. | Sag resistance | Heating deformation rate | Tensile modulus (MPa) | Dielectric loss tangent | Ratio (Q300/Q0) | Space charge |
| Comparative Example 5 | 17.0 | 16.5 | 89 | 200 | 178.3 | 0.12 | Present | ≥0.1 | ≥0.3 | Absent | Less than 10% | 300 | 0.50 | 3.8 | Present |
| Comparative Example 6 | 32.5 | 8.8 | 120 | 210 | 172.4 | 0.15 | Present | ≥0.1 | ≥0.3 | Absent | Less than 10% | 300 | 0.30 | 2.0 | Present |
| Comparative Example 7 | 42.3 | 11.4 | 118 | 222 | 171.4 | 0.16 | Present | ≥0.1 | ≥0.3 | Absent | Less than 10% | 250 | 0.40 | 2.0 | Present |

TABLE 5

| | Component ratio derived from styrene-based elastomer in mixture | | | | | | | Loss tangent tan δ | | | | | | | |
|---|---|---|---|---|---|---|---|---|---|---|---|---|---|---|---|
| | Styrene ratio (%) | Ethylene ratio (%) | Lowest temperature of high-temperature-side temperature region (° C.) | Highest temperature of high-temperature-side temperature region (° C.) | Highest temperature in which loss tangent tan δ was 0.1 to 0.3 (° C.) | Loss tangent tan δ at 90° C. | Presence/absence of low-temperature-side temperature region | 160 ± 20° C. | 210 ± 40° C. | Sag resistance | Heating deformation rate | Tensile modulus (MPa) | Dielectric loss tangent | Ratio (Q300/Q0) | Space charge |
| Example 11 | 15.0 | 26.3 | 157 | 250 | 198.1 | 0.13 | Present | ≥0.1 | ≤0.4 | Present | Less than 10% | 450 | 0.10 | 1.5 | Absent |
| Example 12 | 10.0 | 20.0 | 156 | 244 | 183.3 | 0.07 | Present | ≥0.1 | ≤0.4 | Present | Less than 10% | 500 | 0.11 | 1.7 | Absent |
| Example 13 | 16.0 | 22.7 | 156 | 249 | 173.2 | 0.39 | Present | ≥0.1 | ≤0.4 | Present | Less than 10% | 500 | 0.10 | 1.5 | Absent |
| Example 14 | 15.0 | 26.3 | 157 | 250 | 178.3 | 0.13 | Present | ≥0.1 | ≤0.4 | Present | Less than 10% | 500 | 0.12 | 1.7 | Absent |
| Example 15 | 15.0 | 26.3 | 160 | 250 | 176.5 | 0.15 | Present | ≥0.1 | ≤0.4 | Present | Less than 10% | 500 | 0.10 | 1.4 | Absent |
| Comparative Example 8 | 7.0 | 14.0 | 154 | 180 | 165.0 | 0.16 | Present | ≥0.1 | ≥0.4 | Absent | Less than 10% | 750 | 0.16 | 2.3 | Present |
| Comparative Example 9 | 11.2 | 17.9 | 155 | 182 | 165.2 | 0.15 | Present | ≥0.1 | ≥0.4 | Absent | Less than 10% | 750 | 0.20 | 2.5 | Present |

TABLE 6

| | Component ratio derived from styrene-based elastomer in mixture | | | | | | | Loss tangent (Anti-sag performance) | | | | | | | |
|---|---|---|---|---|---|---|---|---|---|---|---|---|---|---|---|
| | Styrene ratio (%) | Ethylene ratio (%) | Lowest temperature of high-temperature-side temperature region (° C.) | Highest temperature of high-temperature-side temperature region (° C.) | Highest temperature in which loss tangent tan δ was 0.1 to 0.3 (° C.) | Loss tangent tan δ at 90° C. | Presence/absence of low-temperature-side temperature region | 125 ± 35° C. | 200 ± 45° C. | Sag resistance | Heating deformation rate | Tensile modulus (MPa) | Dielectric loss tangent | Ratio (Q300/Q0) | Space charge |
| Example 16 | 13.5 | 23.6 | 130 | 245 | 198.7 | 0.06 | Present | ≥0.1 | ≤0.3 | Present | Less than 10% | 350 | 0.12 | 1.2 | Absent |
| Example 17 | 13.5 | 23.6 | 125 | 254 | 185.8 | 0.08 | Present | ≥0.1 | ≤0.3 | Present | Less than 10% | 250 | 0.10 | 1.3 | Absent |
| Example 18 | 13.5 | 23.6 | 102 | 255 | 186.5 | 0.07 | Present | ≥0.1 | ≤0.3 | Present | Less than 10% | 300 | 0.08 | 1.1 | Absent |
| Example 19 | 13.5 | 23.6 | 100 | 244 | 183.5 | 0.08 | Present | ≥0.1 | ≤0.3 | Present | Less than 10% | 350 | 0.05 | 1.3 | Absent |
| Example 20 | 13.5 | 23.6 | 145 | 250 | 188.1 | 0.08 | Present | ≥0.1 | ≤0.3 | Present | Less than 10% | 500 | 0.04 | 1.4 | Absent |
| Example 21 | 13.5 | 23.6 | 150 | 240 | 187.9 | 0.07 | Present | ≥0.1 | ≤0.3 | Present | Less than 10% | 500 | 0.05 | 1.5 | Absent |
| Example 23 | 13.5 | 23.6 | 124 | 250 | 194.2 | 0.06 | Present | ≥0.1 | ≤0.3 | Present | Less than 10% | 450 | 0.04 | 1.4 | Absent |
| Example 24 | 15.0 | 26.3 | 122 | 270 | 210.2 | 0.08 | Present | ≥0.1 | ≤0.3 | Present | Less than 10% | 250 | 0.08 | 1.6 | Absent |
| Comparative Example 10 | 0 | 0 | 92 | 168 | 166.5 | 0.25 | Absent | ≥0.1 | ≥0.4 | Absent | Less than 10% | 450 | 1.5 | 4.5 | Present |
| Comparative Example 11 | 0 | 0 | 102 | 163 | 167.3 | 0.22 | Absent | ≥0.1 | ≥0.4 | Absent | Less than 10% | 800 | 0.30 | 1.9 | Absent |
| Comparative Example 12 | 0 | 0 | 122 | 166 | 166.5 | 0.16 | Present | ≥0.1 | ≥0.4 | Absent | Less than 10% | 750 | 0.4 | 1.6 | Absent |
| Comparative Example 13 | 0 | 0 | 135 | 165 | 162.5 | 0.22 | Absent | ≥0.1 | ≥0.4 | Absent | Less than 10% | 600 | 0.9 | 3.2 | Present |
| Comparative Example 14 | 0 | 0 | 120 | 168 | 168.5 | 0.14 | Absent | ≥0.1 | ≥0.4 | Absent | Less than 10% | 550 | 0.8 | 4.1 | Present |
| Comparative Example 15 | 0 | 0 | 150 | 174 | 170.2 | 0.15 | Present | ≥0.1 | ≥0.4 | Absent | Less than 10% | 800 | 2 | 5 | Present |
| Comparative Example 16 | 0 | 0 | 122 | 166 | 160.7 | 0.12 | Absent | ≥0.1 | ≥0.4 | Absent | Less than 10% | 320 | 1.60 | 3.2 | Absent |
| Comparative Example 17 | 0 | 0 | 125 | 169 | 160.6 | 0.22 | Present | ≥0.1 | ≥0.4 | Absent | Less than 10% | 750 | 1.5 | 3.4 | Absent |

TABLE 6-continued

| | Component ratio derived from styrene-based elastomer in mixture: Styrene ratio (%) | Ethylene ratio (%) | Lowest temperature of high-temperature-side temperature region (° C.) | Highest temperature of high-temperature-side temperature region (° C.) | Highest temperature in which loss tangent tan δ was 0.1 to 0.3 (° C.) | Loss tangent tan δ at 90° C. | Presence/absence of low-temperature-side temperature region | Loss tangent (Anti-sag performance) 125 ± 35° C. | 200 ± 45° C. | Sag resistance | Heating deformation rate | Tensile modulus (MPa) | Dielectric loss tangent | Ratio (Q300/Q0) | Space charge |
|---|---|---|---|---|---|---|---|---|---|---|---|---|---|---|---|
| Comparative Example 18 | 15.0 | 26.3 | 120.0 | 165.0 | 158.2 | 0.15 | Absent | ≥0.1 | ≤0.4 | Absent | 10% or more | 150 | 1.5 | 3.4 | Absent |
| Comparative Example 19 | 15.0 | 26.3 | 130.8 | 260 | 163.9 | 0.18 | Absent | ≥0.1 | ≤0.4 | Absent | 10% or more | 250 | 1.5 | 3.4 | Absent |
| Comparative Example 20 | 15.0 | 26.3 | 118.5 | 260 | 160.1 | 0.17 | Absent | ≥0.1 | ≤0.4 | Absent | 10% or more | 200 | 1.5 | 3.4 | Absent |

As shown in Tables 1 and 2 and Tables 4 and 5, in Examples 1 to 10, since the temperature characteristic curve of the loss tangent tan δ has the high-temperature-side temperature region and the low-temperature-side temperature region, and the highest temperature of the high-temperature-side temperature region is 240° C. or more, it is superior in flexibility and the electrical insulation property, and could suppress the thermal deformation and the sag. In addition, since the dielectric loss tangent and Q300/Q0 were very low, and there was no electric field distortion in the space charge characteristic, all of the examples were found to have superior electrical insulation property under DC current or under AC current. In particular, in Examples 3 to 8 and 10, since abundantly containing styrene-based elastomer with high ethylene ratio and adding a great amount to random polypropylene, the compatibility with the random polypropylene becomes good, and as a result, the electrical insulation property under DC current or under AC current is superior.

Furthermore, as shown in Table 3 and Table 6, even when the resins such as polyethylene, polystyrene, etc., the filler component, and the oily liquid as third component were further added within the desired ranges to the above-mentioned Example 3, as in Examples 16 to 24, the sag will not occur, and the electrical insulation property under DC current or AC current was superior. This is because favorable compatibility was obtained by controlling the ethylene component and the styrene component in the styrene-based elastomer, and the mixing ratio thereof.

On the other hand, in Comparative Examples 1 to 20, since the temperature characteristic curve of the loss tangent tan δ did not have a low-temperature-side temperature region, or the highest temperature of the high-temperature-side temperature region was over 240° C., the decline in flexibility or electrical insulation property, and the occurrence of thermal deformation or sag was confirmed. In particular, in Comparative Examples 1 to 9, the content proportion of polypropylene resin was not 20% by mass or more and 55% by mass or less, or the ethylene component ratio derived from the styrene-based thermoplastic elastomer in the insulating resin composition was low; therefore, the loss tangent obtained by the dynamic viscoelastic measurement under temperature condition of the melting temperature or more was 0.3 or more. For this reason, since the sag occurred by the weight of the resin itself due to melting during molding, even if the composition having superior electrical insulation property, the roundness could not be held and thus proper cable molding is no longer possible. In addition, although Comparative Examples 10 to 17 were polypropylene compositions free of styrene-based elastomer, due to lacking compatibility, the sag occurs. In addition, Comparative Examples 18 to 20 changed the base material to a material having more ethylene component than a propylene resin such as polyethylene. As a result thereof, it was found that the heating deformability was poor due to the ethylene component being excessive. This suggests that it will deform when made into a cable either by the electric heating of current flowing and external load.

EXPLANATION OF REFERENCE NUMERALS

10 electric power cable
11 conductor
12 internal semiconducting layer
13 insulating layer
14 external semiconducting layer
15 metal shielding layer
16 sheath
20 electric power cable connecting part
21 connecting part
22 connecting part internal semiconducting layer
23 connecting part insulating layer
24 connecting part external semiconducting layer

The invention claimed is:

1. An insulating resin composition for electric power cable comprising: a polypropylene resin (A) which is a propylene-based polymer; and a styrene-based thermoplastic elastomer (B), wherein a temperature characteristic curve of loss tangent tan δ obtained by dynamic viscoelasticity measurement at a frequency of 100 rad/s has a high-temperature-side temperature region in which the loss tangent tan δ is 0.1 or more and 0.4 or less, and a low-temperature-side temperature region in which the loss tangent tan δ is less than 0.1; and a highest temperature of the high-temperature-side temperature region is 240° C. or more; and a content proportion of styrene contained in the insulating resin composition for electric power cable is 12.5% by mass or more and 30% by mass or less.

2. The insulating resin composition for electric power cable according to claim 1, wherein a lowest temperature of the high-temperature-side temperature region is 90° C. or more and 175° C. or less.

3. The insulating resin composition for electric power cable according to claim 1, wherein a lowest temperature of the high-temperature-side temperature region is 90° C. or more and 150° C. or less.

4. The insulating resin composition for electric power cable according to claim 1, wherein a highest temperature in a range of loss tangent tan δ of 0.1 or more and 0.3 or less in the high-temperature-side temperature region is 160° C. or more.

5. The insulating resin composition for electric power cable according to claim 1, wherein the loss tangent tan δ at 90° C. on the temperature characteristic curve of the loss tangent tan δ is less than 0.1.

6. The insulating resin composition for electric power cable according to claim 1, wherein a content ratio of the polypropylene resin (A) and the styrene-based thermoplastic elastomer (B) is 20.0 to 55.0:45.0 to 80.0 by % by mass of the polypropylene resin (A): the styrene-based thermoplastic elastomer (B).

7. The insulating resin composition for electric power cable according to claim 1, wherein the styrene-based thermoplastic elastomer (B) contains a constituent unit derived from styrene, and contains at least one of a constituent unit derived from ethylene and a constituent unit derived from a C3 to C30 α-olefin.

8. The insulating resin composition for electric power cable according to claim 1, wherein when establishing a total of the constituent unit derived from styrene, the constituent unit derived from ethylene, and the constituent unit derived from a C3 to C30 α-olefin that constitute the styrene-based thermoplastic elastomer (B) as 100% by mass, the constituent unit derived from styrene is 10.0% by mass or more and 60.0% by mass or less, and the constituent unit derived from ethylene is 20.0% by mass or more and 70.0% by mass or less.

9. The insulating resin composition for electric power cable according to claim 1, wherein the polypropylene resin (A) is a homo polypropylene.

10. The insulating resin composition for electric power cable according to claim 1, wherein the polypropylene resin (A) is a random polypropylene containing a constituent unit derived from ethylene and a constituent unit derived from a C3 to C30 α-olefin.

11. The insulating resin composition for electric power cable according to claim 1, wherein the polypropylene resin (A) is a block polypropylene containing a homo polypropylene, a constituent unit derived from ethylene, and a constituent unit derived from a C3 to C30 α-olefin.

12. The insulating resin composition for electric power cable according to claim 1, wherein the insulating resin composition for electric power cable consists of the polypropylene resin (A) and the styrene-based thermoplastic elastomer (B).

13. The insulating resin composition for electric power cable according to claim 1, wherein a dielectric loss tangent when applying an AC electric field of 30 kV/mm at 90° C. is 0.15% or less.

14. The insulating resin composition for electric power cable according to claim 1, wherein a ratio (Q300/Q0) of electric charge amount (Q300) after 5 minutes when applying a DC electric field of 30 kV/mm at 90° C. relative to initial electric charge amount (Q0) is 2.00 or less.

15. An electric power cable comprising:

a conductor;

an internal semiconducting layer covering an outer circumference of the conductor;

an insulating layer consisting of the insulating resin composition for electric power cable according to claim 1 covering an outer circumference of the internal semiconducting layer; and an external semiconducting layer covering an outer circumference of the Insulating layer.

16. An electric power cable connecting part comprising:

a connecting part internal semiconducting layer that covers a connecting part connecting a conductor of one electric power cable with a conductor of another electric power cable, an exposed portion of the conductor of the one electric power cable, and an exposed portion of the conductor of the other electric power cable;

a connecting part insulating layer consisting of the insulating resin composition for electric power cable according to claim 1, the connecting part insulating layer covering an outer circumference of the connecting part internal semiconducting layer; and a connecting part external semiconducting layer that covers an outer circumference of the connecting part insulating layer.

* * * * *